United States Patent
Kim et al.

(10) Patent No.: US 7,102,838 B2
(45) Date of Patent: Sep. 5, 2006

(54) METHODS OF OPTIMIZING RECORDING CURRENT AND SETTING RECORDING DENSITY OF HARD DISK DRIVE

(75) Inventors: Jong-yoon Kim, Yongin-si (KR); Chang-dong Yeo, Yongin-si (KR); Seung-hyun Song, Seoul (KR); Geun-soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 10/733,818

(22) Filed: Dec. 12, 2003

(65) Prior Publication Data

US 2004/0174627 A1 Sep. 9, 2004

(30) Foreign Application Priority Data

Dec. 13, 2002 (KR) .................. 10-2002-0079750

(51) Int. Cl.
*G11B 27/36* (2006.01)

(52) U.S. Cl. .................. 360/31; 360/53; 360/25; 360/60; 360/39

(58) Field of Classification Search .............. None
See application file for complete search history.

(56) References Cited

U.S. PATENT DOCUMENTS

| | | | |
|---|---|---|---|
| 4,821,125 A | | 4/1989 | Christensen et al. |
| 5,408,367 A | * | 4/1995 | Emo ..................... 360/53 |
| 5,600,500 A | * | 2/1997 | Madsen et al. ........... 360/46 |
| 5,610,776 A | * | 3/1997 | Oh ..................... 360/53 |
| 5,687,036 A | * | 11/1997 | Kassab ................. 360/53 |
| 6,069,758 A | * | 5/2000 | Chung .................. 360/31 |
| 6,101,053 A | * | 8/2000 | Takahashi .............. 360/46 |
| 6,252,731 B1 | * | 6/2001 | Sloan et al. ............ 360/31 |
| 6,295,175 B1 | * | 9/2001 | Tomita et al. .......... 360/31 |
| 6,445,521 B1 | * | 9/2002 | Schaff et al. .......... 360/31 |
| 6,661,594 B1 | * | 12/2003 | Satoh et al. ........... 360/65 |
| 6,791,780 B1 | * | 9/2004 | Lee et al. ............. 360/66 |
| 6,914,738 B1 | * | 7/2005 | Fujiwara et al. ........ 360/68 |
| 6,975,475 B1 | * | 12/2005 | Lee et al. ............. 360/68 |
| 2003/0112541 A1 | * | 6/2003 | Lee et al. ............. 360/55 |

FOREIGN PATENT DOCUMENTS

| | | |
|---|---|---|
| JP | 63-23206 | 1/1988 |
| JP | 2000-48312 | 2/2000 |
| JP | 2000-251209 | 9/2000 |
| JP | 2000-357303 | 12/2000 |

(Continued)

OTHER PUBLICATIONS

Japanese Office Action for Application No. 2003-417225 dated Oct. 27, 2005.

*Primary Examiner*—Wayne Young
*Assistant Examiner*—Dismery Mercedes
(74) *Attorney, Agent, or Firm*—Staas & Halsey LLP

(57) ABSTRACT

A method optimizing a recording current in consideration of operating temperatures of a hard disk drive and a method of setting a recording density in consideration of tracks per inch (TPI) or adjacent track erasure (ATE) characteristics. The method of optimizing the recording current measures a rate of errors under a test condition corresponding to the operating temperature of a hard disk drive, while changing a recording parameter, selects a recording parameter value corresponding to a smallest rate of errors, and optimizes the recording current for the hard disk drive under operating environmental conditions using the selected recording parameter value.

9 Claims, 9 Drawing Sheets

FOREIGN PATENT DOCUMENTS

KR 1998-032551 7/1998
KR 10-2004-0025374 A 3/2004

* cited by examiner

ROTATION DIRECTION OF HARD DISK

ROTATION DIRECTION OF HARD DISK

METHODS OF OPTIMIZING RECORDING CURRENT AND SETTING RECORDING DENSITY OF HARD DISK DRIVE

CROSS-REFERENCE TO RELATED APPLICATIONS

This application claims the priority of Korean Patent Application No. 2002-79750 filed Dec. 13, 2002, in the Korean Intellectual Property Office, the disclosure of which is incorporated herein in its entirety by reference.

BACKGROUND OF THE INVENTION

1. Field of the Invention

The present invention relates to a hard disk drive, and more particularly, to methods of optimizing a recording current according to an operating environment temperature, and setting tracks per inch (TPI), or recording density, in consideration of the adjacent track erasure (ATE) characteristics of a head.

2. Description of the Related Art

A hard disk drive is a recording device used to store information. In general, tracks are concentric circles formed on a recording surface of a magnetic recording disc, and information is recorded on at least one track. In the hard disk drive, a disk is rotated with respect to a spindle motor, and information is accessed by a read/write unit built in an actuator arm that is rotated by a voice coil motor. The voice coil motor is excited by an electric current, rotates the actuator arm, and moves a write/read head. The write/read head senses a change in magnetism generated on the surface of the disk, and reads information from the recording surface of the disk. An electric current is supplied to the head to record information on a data track. The supplied electric current generates magnetism and the magnetism magnetizes a portion of the recording surface of the disc.

Recording density can be increased by increasing a density of track, (Track Per Inch; TPI) and by decreasing a flying height (FH) of a head. However increase of TPI and decrease of FH may cause erasure of data recorded on a track adjacent to a target track due to the magnetism generated by the magnetic recording head. Such a phenomenon is called adjacent track erasure (ATE). The ATE becomes important when a recording current generated by the head is excessively high. However, the recording performance of the hard disk drive deteriorates when the recording current is insufficiently supplied.

Meanwhile, as hard disk drives have been developed to have a high capacity, or high density, the TPI has been required to increase, thereby causing track width to become narrower, and thus, recording control performance needs to be improved to adjust a recording width of the magnetic head, and reduce noise produced by the magnetic head.

U.S. Pat. No. 6,101,053 discloses a method of setting a write condition by recording data on m+1th and m−1th tracks of a disk by a specific offset, measuring the rate of errors in data recorded on an mth track, and setting tracks per inch (TPI) to adjust the rate of errors to a desired level. However, this method is not capable of preventing ATE of a head caused by a level of a write current, which is a portion of the recording current, as will be explained later.

Conventionally, the recording current is optimized in consideration of the degree of ATE of a head during a burn-in test process of a hard disk drive.

To prevent ATE, the level of the write current is reduced through adaptive read channel optimization (ARCO) in a hard disk drive, for respective data zones of a disk, or according to temperature.

In general, during manufacture of hard disk drives, adjacent track writing (ATW) is performed several hundred or several thousand times, to adjust heads undergoing ATE. In general, during manufacture of a hard disk drive, processes such as a servo write process, a functional test, and a burn-in test are sequentially performed. The servo write process records location information on a disk. The functional test checks whether a maintenance cylinder has defects or whether a read/write operation can be satisfactorily performed in a data zone of a disc. The burn-in test carries out optimization of a read channel and optimization of a write channel of the hard disk drive. The optimization of the read and write channels is performed by a controller included in the hard disk drive.

More specifically, the coercivity of the hard disk is varied according to a temperature. The coercivity is decreased at high temperature and increased at low temperature.

To solve this problem, conventionally, the write current (WC) or an overshoot current (OSC) (which, as previously mentioned, is part of the recording current) in the hard disk drive is optimized according to the temperature of the hard disk drive. More specifically, the WC or the OSC is increased to reduce the coercivity of the hard disk drive at low temperatures. Similarly, the WC or OSC is reduced to increase the coercivity.

But the conventional optimization of the recording current is disadvantageous, in that the recording current is optimized at a room temperature during the burn-in process, and the write current is uniformly increased or reduced to a predetermined level at environmental conditions during use, e.g., a high-temperature mode and a low-temperature mode. That is, since the recording current is not optimized in consideration of the characteristics of the head, the write current may be increased or reduced to an undesirable level, and cause deterioration of the performance of the hard disk drive.

In particular, the conventional optimization of the recording current does not consider thermal pole tip protrusion (TPTP) affected by a level of the OSC. Accordingly, when conventional optimization is applied to a head of a high-degree TPTP, the level of the WC or the OSC become excessively high or low, and thus a head/disk interface (hereinafter referred to as "HDI") worsens. The deterioration of HDI is likely to cause many problems, such as damage to the head, thermal asperity (TA), and a reduction in altitude margin (marginal change due to a change in the FH of the head due to a change in an atmospheric pressure).

SUMMARY OF THE INVENTION

The present invention provides a method of optimizing a recording current, the method including: measuring recording characteristics of and degree of adjacent track erasure (ATE) of individual heads of the hard disk drive; storing the results of the measurement in a system cylinder or a buffer; and one of adjusting levels of one of a write current (WC) and an overshoot current (OSC) to a minimum level in a high-temperature mode, while maintaining a recording capability of the individual heads, and adjusting one of the WC and the OSC to a maximum level in a low-temperature mode while maintaining an optimum bit error rate (BER).

The present invention also provides a method of setting a recording density for a hard disk drive, including: determining whether a performance of a head will deteriorate when a level of one of a write current (WC) and an overshoot current (OSC) is high at low temperatures; and adjusting a number of tracks per inch (TPI) based on the determination.

According to an embodiment of the present invention, there is provided a method of optimizing a recording current, the method comprising measuring a rate of errors under a test condition corresponding to an operating temperature of a hard disk drive, while changing a recording parameter value, selecting a recording parameter corresponding to a smallest rate of errors; and optimizing the recording current for the hard disk drive under operating environmental conditions using the selected recording parameter value.

According to one aspect, when the test condition corresponds to a low temperature, data is recorded on a target track a predetermined number of times, and the data is read from the target track a predetermined number of times.

According to one aspect, when the test condition corresponds to a room temperature, data is recorded on tracks adjacent to a target track a predetermined number of times, N, wherein and the data is read from the target track a predetermined number of times.

According to one aspect, when the test condition corresponds to a high temperature, data is recorded on tracks adjacent to a target track a predetermined number of times, M, wherein M>N and the data is read from the target track a predetermined number of times.

According to another embodiment of the present invention, there is provided a method of optimizing a recording density, the method comprising measuring a rate of errors in data recorded on a target track under a predetermined adjacent track erasure (ATE) test condition, comparing the rate of errors with a predetermined threshold, and adjusting the recording density by changing tracks per inch (TPI) when the rate of errors is larger than the predetermined threshold.

According to one aspect, under the predetermined ATE test condition, the OSC is set to a maximum value.

According to one aspect, the measuring the rate of errors in data recorded on the target track under the predetermined ATE test condition comprises: recording data is recorded on tracks adjacent to a target track in a first direction, a predetermined number of times; reading data from the target track a predetermined number of times; and measuring the rate of errors in the read data. According to one aspect, a number of the tracks adjacent to the target track in the first direction is at least one.

According to one aspect, an error correction capability of the hard disk drive that uses an error-correction code (ECC) is reduced prior to measuring the rate of errors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
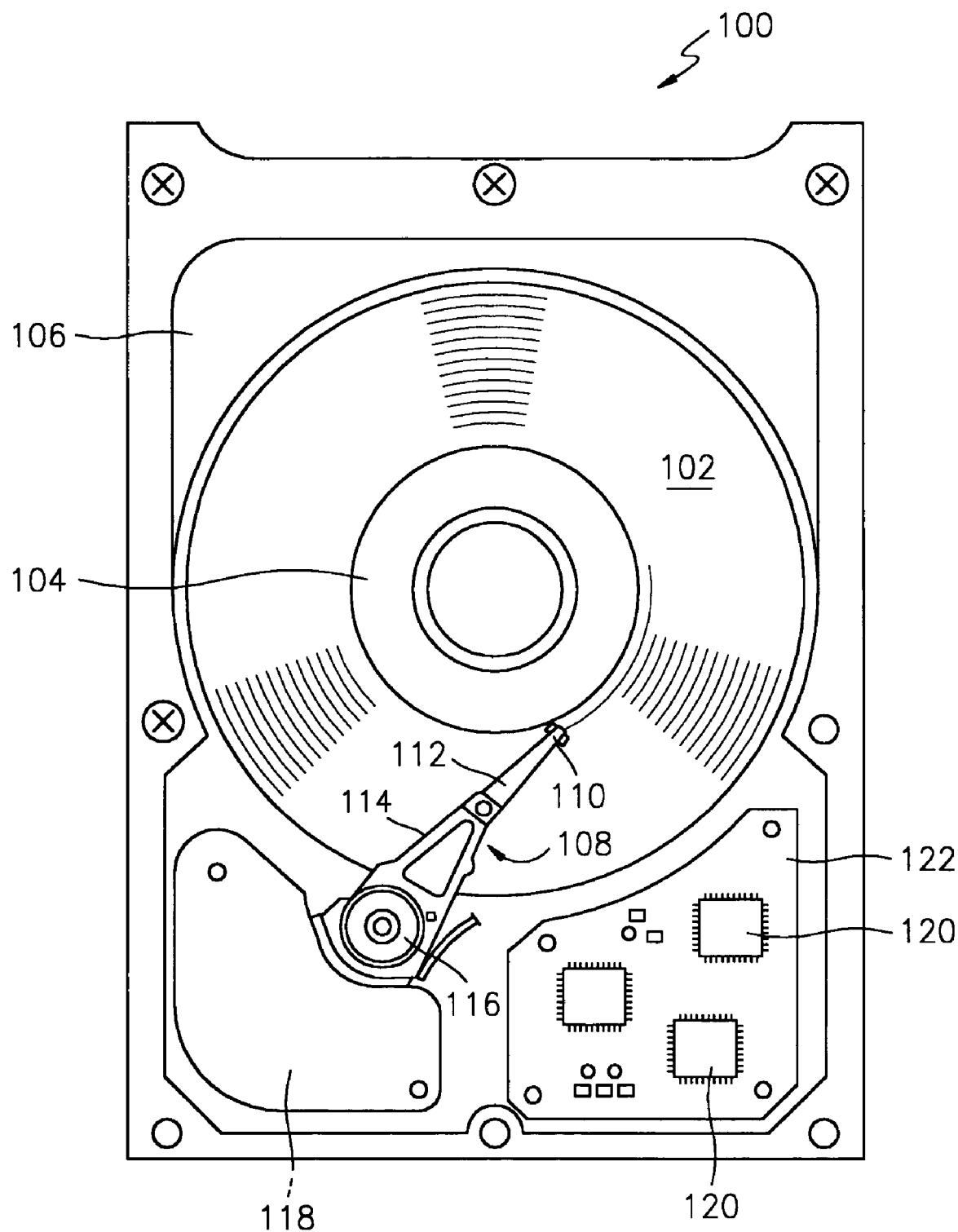
FIG. 1 is a schematic plan view illustrating the structure of a hard disk drive.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates the structure of a hard disk drive 100. The hard disk drive 100 includes a magnetic disk 102 that is rotated by a spin motor 104. The spin motor 104 is mounted on a base plate 106. An actuator arm assembly 108 is also mounted on the base plate 106. The actuator arm assembly 108 includes a plurality of heads 110 coupled to respective suspensions 112. The suspensions 112 are attached to an actuator arm 114 that is rotated with respect to a bearing assembly 116. The actuator arm assembly 108 includes a voice coil 118 coupled to a magnet (not shown) mounted on the base plate 106. When energy is supplied to the voice coil 118, the heads 110 are moved toward the disk 102. In general, there is a head 110 for each portion of the disk surface. The spin motor 104, the voice coil 118, and the heads 110 are connected to a plurality of electronic circuits 120 installed in a printed circuit board 122. In general, each of the electronic circuits 120 includes a read channel circuit, a microprocessor-based controller, and random access memory (RAM).

Figure 2:
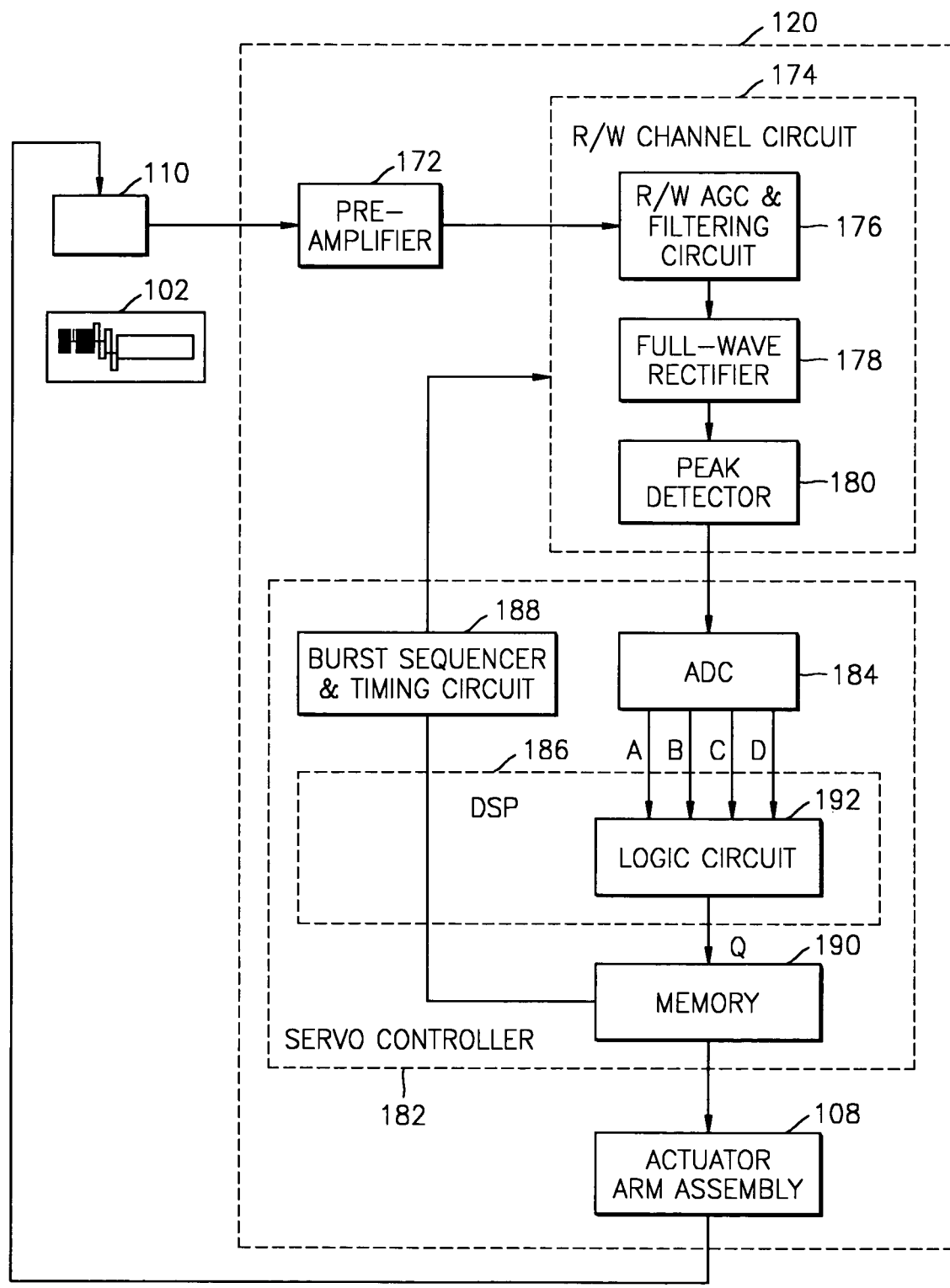
FIG. 2 is a detailed block diagram illustrating the structure of each electronic circuit included in the hard disk drive of FIG. 1.

FIG. 2 is a detailed block diagram illustrating a structure of one of the electronic circuits 120 shown in FIG. 1. This electronic circuit 120 includes a pre-amplifier 172 coupled to a read/write (R/W) channel circuit 174. The R/W channel circuit 174 includes a R/W automatic gain control (AGC) and filtering circuit 176, a full-wave rectifier 178, and a peak detector 180. The electronic circuit 120 further includes a microprocessor-based servo controller 182. The servo controller 182 includes an analog-to-digital converter (ADC) 184, a digital signal processor (DSP) 186, a burst sequencer and timing circuit 188, and memory 190 such as random access memory. The DSP 186 includes a logic circuit 192.

The electronic circuit 120 shown in FIG. 2, is coupled to one of the plurality of magnetic heads 110, that senses a magnetic field of the magnetic disk 102. The head 110 generates a read signal corresponding to the magnetic field of the magnetic disk 102 while reading servo information recorded in a servo field zone of the magnetic disk 102. The read signal is amplified by the pre-amplifier 172 and transmitted to the R/W channel circuit 174. Automatic gain control (AGC) data contained in the read signal is sent to the R/W AGC and filtering circuit 176. An R/W AGC circuit included in the R/W AGC and filtering circuit 176 monitors the AGC data contained in the read signal, and the read signal is filtered by a filter included in the R/W AGC and filtering circuit 176. The full-wave rectifier 178 rectifies the read signal and transmits the rectified read signal to the peak detector 180. The peak detector 180 detects the amplitude of the read signal.

Next, the read signal is supplied to the ADC 184, which provides binarized samples of an analog read signal. The binarized read signals are transmitted to the logic circuit 192 included in the DSP 186. The logic circuit 192 generates a location signal Q using burst signals A, B, C, and D read by the head 110. The location signal Q is stored in the memory 190 and provided to the actuator arm assembly 108 to move the head 110.

In general, in a hard disk drive, a recording magnetic head is formed of metal, such as Permalloy containing 80% of Ni and 20% of Fe. And a slider, which supports the head, is formed of a non-metallic material.

Therefore, during a write operation when the recording current flows through a metal coil, heat is generated and causes different expansions in the recording magnetic head and the slider, because of the difference between coefficients of thermal expansion of the recording magnetic head, which is a metal material, and the slider which is a non-metallic material. The difference causes a circumference of a pole of the head to protrude. Such a phenomenon is called thermal pole tip protrusion (TPTP).

Generally TPTP reduces the margin of the interface between a head and a disk, i.e., HDI, resulting in a decrease in the flying height of the head. If the degree of TPTP is beyond a desired level, the HDI deteriorates. In a worst-case scenario, excessively high TPTP causes a collision of the disk with the head, damage to the head pole, and thermal asperity (TA).

Figure 3A:
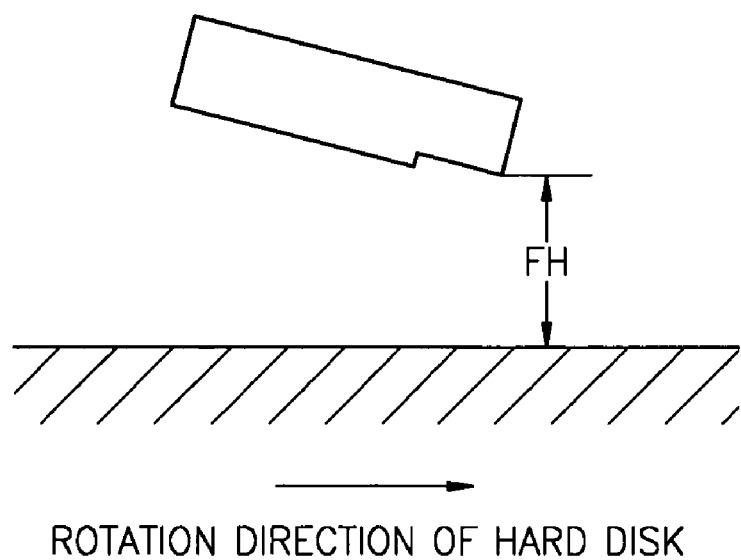
FIGS. 3A and 3B illustrate problems caused by thermal pole tip protrusion (TPTP) of a head.
Figure 3B:
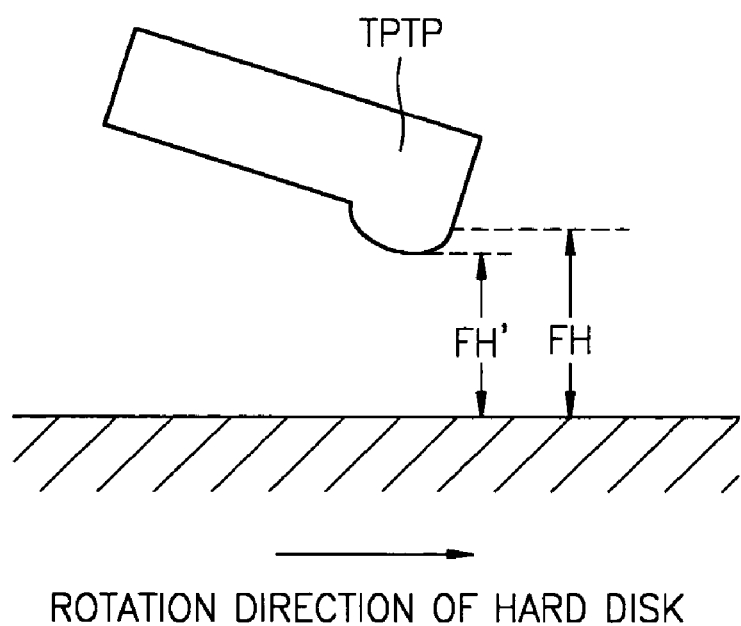

FIGS. 3A and 3B illustrate problems caused by TPTP of a head. FIG. 3A shows the state of the head 110 during a read operation and FIG. 3B shows the state of the head 110 during a write operation. Referring to FIG. 3B, a recording pole of the head 110 protrudes. The protrusion of the recording pole reduces the flying height of the head and causes the head to collide with a disk (not shown) in a worst-case scenario, thereby causing damage to the head pole, and thermal asperity (T A).

TPTP is proportional to $i^2R$. Here, i denotes the recording current and R denotes a resistance of a recording coil.

Figure 4:
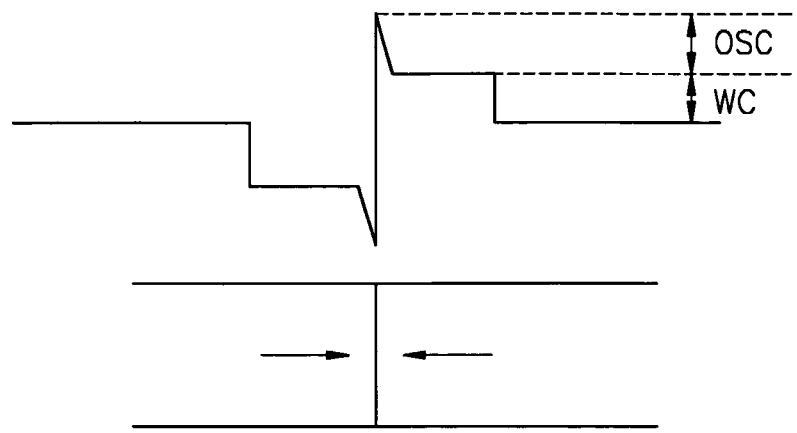
FIG. 4 is a waveform diagram of the recording current.

FIG. 4 is a waveform diagram of a generalized recording current. As shown in FIG. 4, the recording current has a sharp rising edge at a turning point of data to be recorded on a disk. Here, a DC substance of the recording current is called a write current (WC) and a rising substance of the recording current is called an overshoot current (OSC).

The DC substance, i.e., the write current (WC), of the recording current maintains the intensity of a magnetic field to be almost equivalent to the coercivity of a hard disk, and the OSC actions such that it can trigger the raising of the intensity of the magnetic field to be the same as or stronger than the coercivity in a recording direction.

TPTP of the head is the most greatly affected by the OSC during a write operation.

Figure 5:
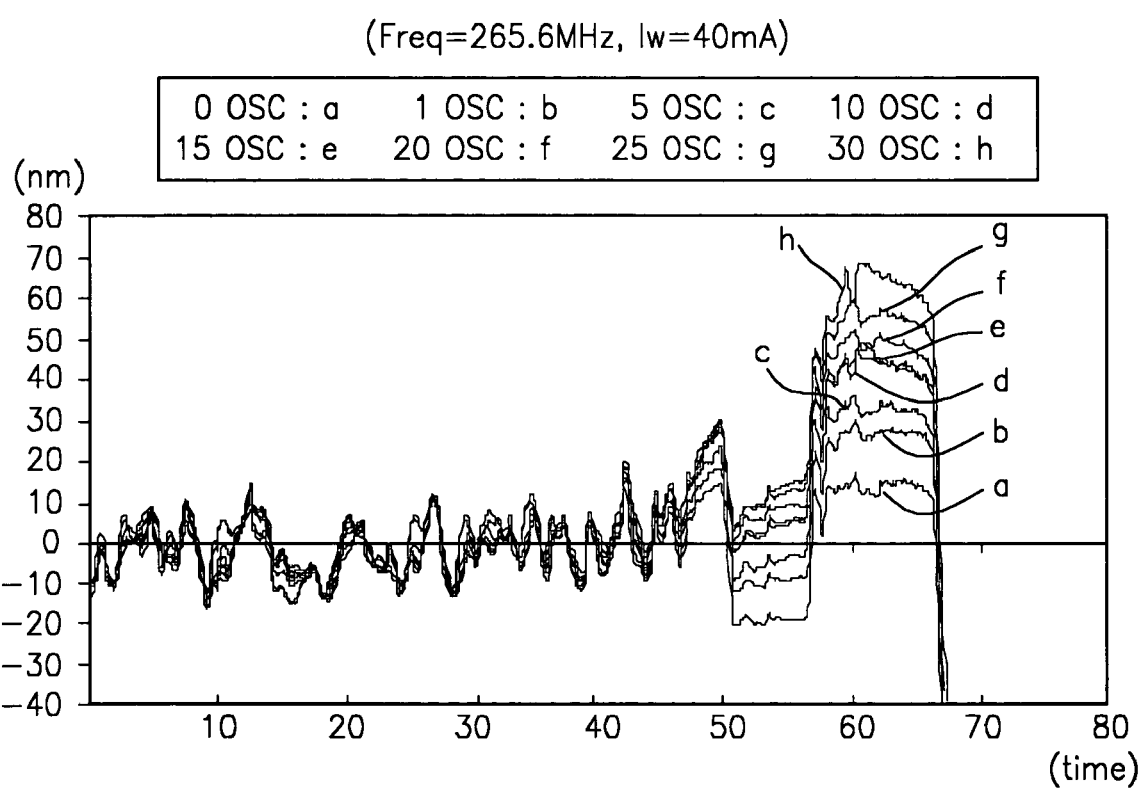
FIG. 5 is a graph illustrating a variation in TPTP of the head versus a change in overshoot control.

FIG. 5 is a graph illustrating a variation in TPTP of a head versus a change in an overshoot control value. The graph indicates the magnitudes of TPTP in units of nm, when overshoot control values of a recording current are 0(*a*), 1(*b*), 5(*c*), 10(*d*), 15(*e*), 20(*f*), 25(*g*), and 30(*h*), respectively.

When the profile of TPTP is measured while changing an overshoot control value of the recording current, the higher the overshoot control value, the greater the degree of TPTP. That is, the larger the overshoot control value of the recording current, the smaller a gap between the head 10 and the disk 102. An experiment revealed that TPTP was formed to a thickness of 10 Å when the overshoot control value changed by four steps. That is, the flying height is reduced by about 10% when the overshoot control value changes by four steps, considering that in general the flying height of the head 110 is about 100 Å. This means that the performance of a hard disk drive can be greatly affected by TPTP.

Figure 6:
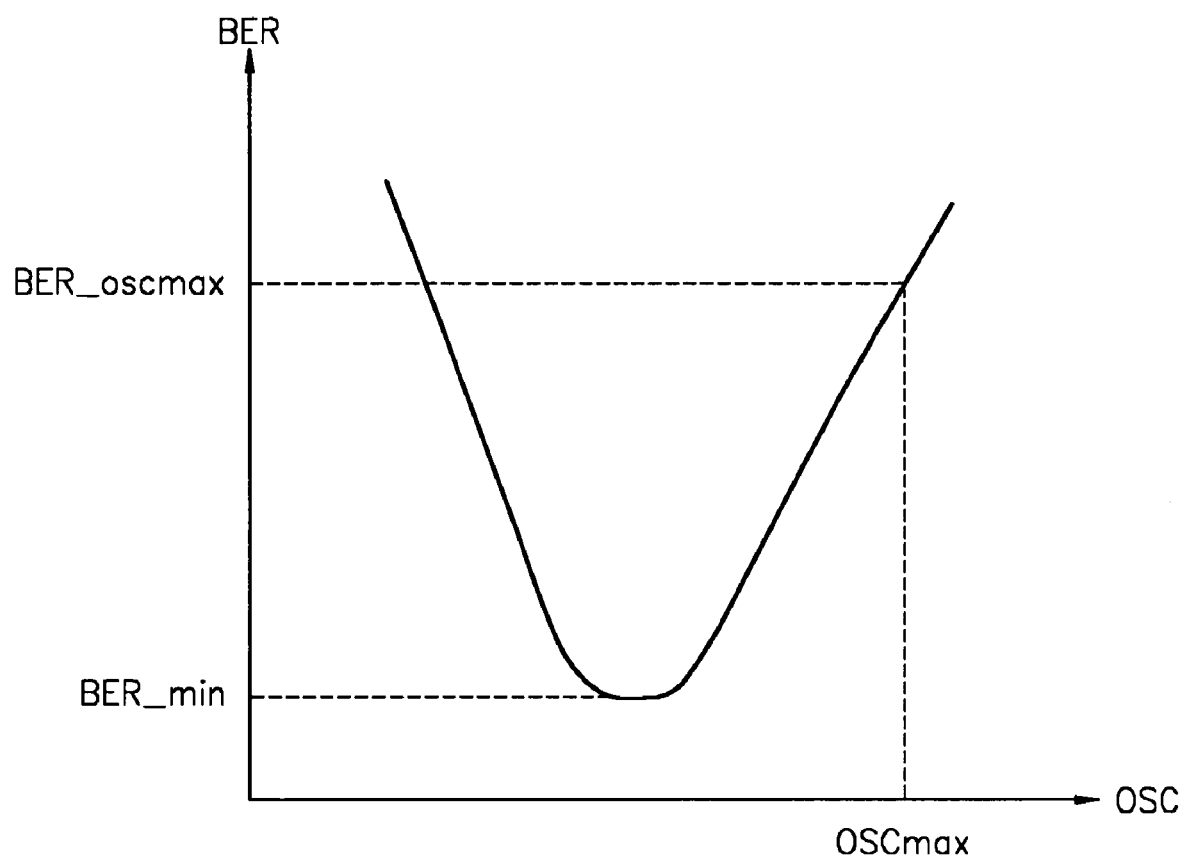
FIG. 6 is a graph illustrating a relationship between an overshoot current (OSC) and a bit error rate (BER)

FIG. 6, a variation in the BER versus a variation in the OSC depicts a V-shaped curve with a minimum BER BER_min as a bight. In this relationship, the magnitude of a magnetic field becomes smaller and the BER becomes larger when the level of OSC is low, whereas the degree of TPTP becomes greater and the BER becomes larger when the level of OSC is high.

Figure 7:
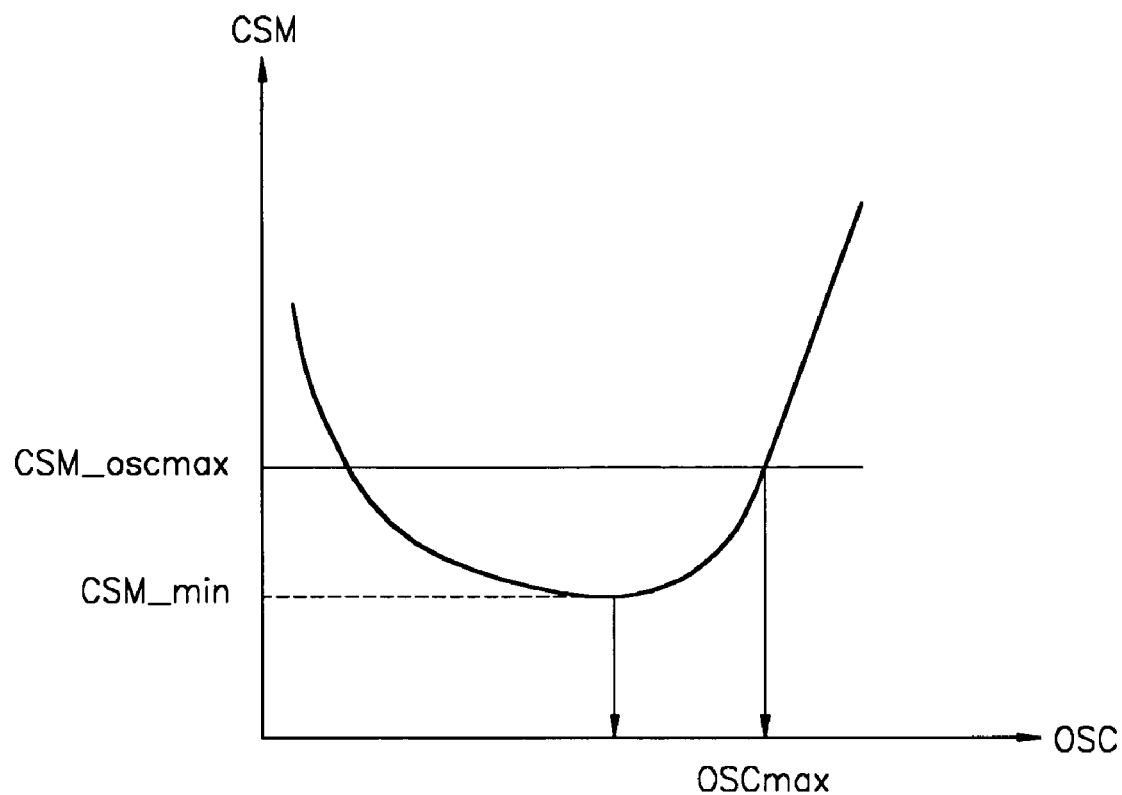
FIG. 7 is a graph illustrating another relationship between the OSC and a channel statistic measurement (CSM)

FIG. 7 is a graph illustrating a relationship between an OSC and a channel statistic measurement (CSM). As is apparent from FIG. 7, the relationship between the OSC and the CSM shows a similar pattern to the relationship between the OSC and the BER shown in FIG. 6.

Here, the BER denotes the rate of bit errors within predetermined numbers of data bits contained in a signal read using the head 110, and the CSM is a channel performance measurement obtained by measuring the rate of bit errors within a channel chip. BER can be measured more quickly using CSMs than using BERs. Also, the BER and the CSM have a roughly logarithmic relationship.

Meanwhile, the degree of TPTP depends on the characteristics of the head 110. For instance, the degree of TPTP changes according to a material of the head 110 or the bonding degree of the head with the slider.

Figure 8:
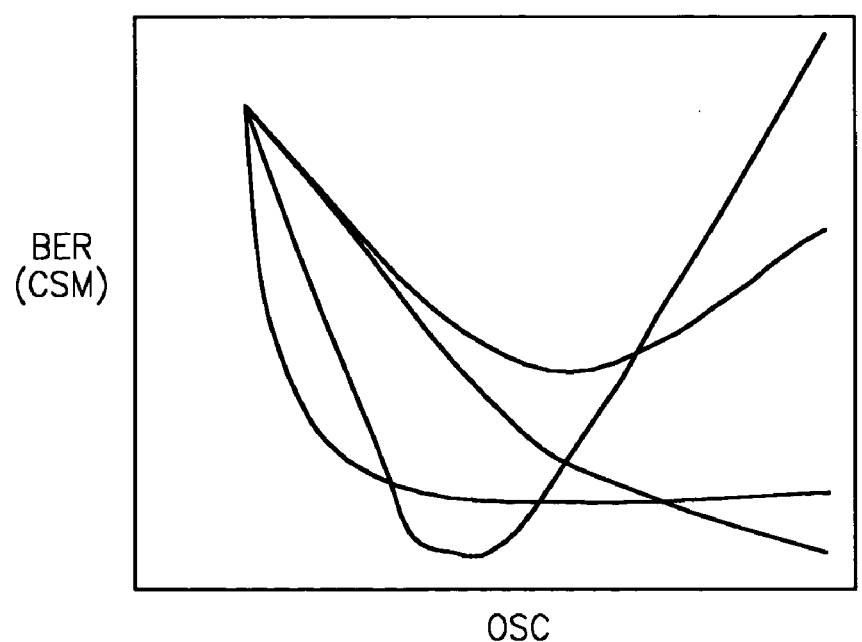
FIG. 8 is a graph illustrating examples of TPTPs of different heads.

FIG. 8 is a graph illustrating examples of TPTPs of different heads. The graph of FIG. 8 shows that the degrees of TPTP of different heads are different from one another.

In the case of a head with a high degree of TPTP, the OSC increases, and the increase in the OSC results in a rapid increase in a BER, and the difference between an optimal OSC and a maximum OSC is large. But in the case of a head with a low degree of TPTP, the OSC and the BER increase or decrease gradually, and the difference between an optimal OSC and a maximum OSC is small.

In an embodiment of the present invention, a level of a recording current is determined in consideration of the degree of TPTP of a head, thereby enabling optimum control of the recording current.

That is, the recording current can be optimally controlled in consideration of a change in ATE according to temperature by stopping recording on tracks adjacent to the target track, or recording on tracks adjacent to the target track a different number of times. Also, it is possible to minimize problems caused by TPTP of a head in consideration of temperature by measuring the characteristics of TPTP under the above test conditions and selecting OSCs corresponding to minimum BERs obtained with respect to the characteristics of TPTP.

Accordingly, the method of optimizing a recording current enables setting of an optimal recording current according to temperature, based on the degrees of ATE and TPTP.

Figure 9:
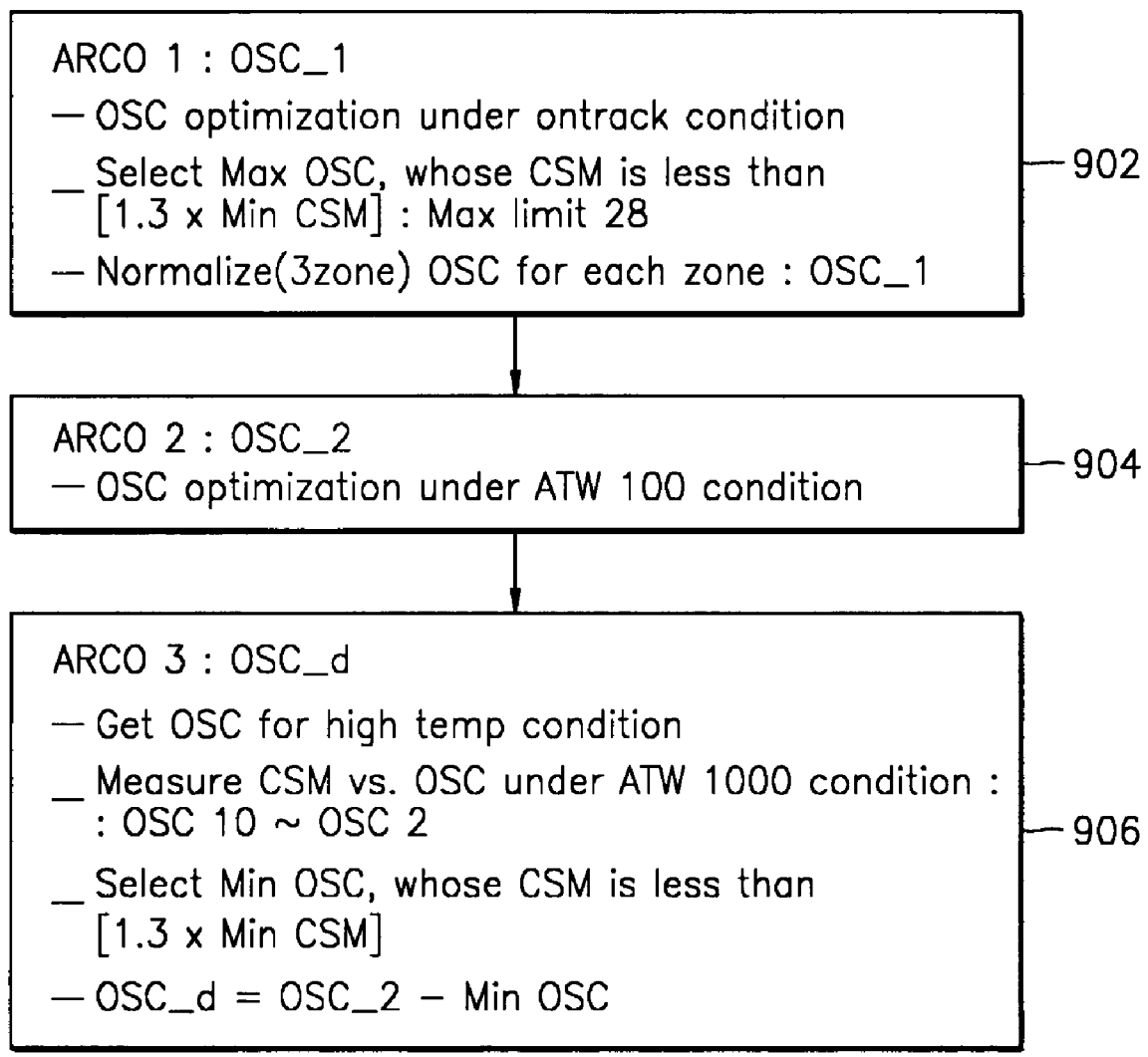
FIG. 9 is a flowchart illustrating a method of optimising a recording current according to an embodiment of the present invention.

FIG. 9 is a flowchart illustrating a method of optimizing a recording current according to an embodiment of the present invention.

Referring to FIG. 9, in operation 902, an OSC corresponding to a small error rate is detected under an on-track condition.

In detail, in operation 902, at a given OSC, data is recorded on the target track a predetermined number of times, e.g., ten times, and the data is read from the target track a predetermined number of times, e.g., six hundred times, and the rate of errors in the data is measured. The characteristics of TPTP of the head are measured by repeating this process while changing the amount of the OSC.

Here, the rate of errors may be a BER or a CSM. In general, the OSC can be controlled by 32 steps but it is preferable that OSC is swept by 28 steps for safety.

Next, an OSC, OSC_1, corresponding to a minimum BER (or CSM) is selected with respect to the detected characteristics of TPTP, i.e., the OSC vs the BER (or the CSM). The selected OSC, OSC_1, is used in a low-temperature mode.

In operation 904, data is recorded on tracks adjacent to the target track a predetermined number of times, N, e.g., one hundred times, and an OSC corresponding to the smallest rate of errors in the data recorded on the target track is determined.

More specifically, in operation 904, at a given OSC, data is recorded on tracks adjacent to the target track one hundred times, data is read from the target track a predetermined number of times, e.g., six hundred times, and the rate of errors in the read data is measured. This process is repeated while changing the amount of the OSC to measure the degrees of TPTP Next, an OSC, OSC_2, corresponding to a minimum BER (or CSM) is selected with respect to the measured degrees of TPTP, i.e., the OSC vs the BER (or the CSM). The OSC, OSC_2, is used in a room-temperature mode.

In operation 906, data is recorded on tracks adjacent to the target track a predetermined number of times, M, (M>N), e.g., a thousand times, and an OSC corresponding to the smallest rate of errors in the data recorded on the target track is determined.

More specifically, in operation 906, at a given OSC, data is recorded on tracks adjacent to the target track a thousand times, data is read from the target track a predetermined number of times, e.g., six hundred times, and the rate of errors in the read data is measured. The degrees of TPTP are measured by repeating this process while changing the amount of OSC.

Next, an OSC, OSC_d, corresponding to a minimum BER (or CSM) is selected with respect to the degrees of TPTP, i.e., the OSC vs the BER (or the CSM). The OSC, OSC_d, is used in a high-temperature mode.

The method of FIG. 9 is also repeatedly performed while changing heads and data zones, to obtain recording current set parameters for different heads, different data zones, and different temperatures. The obtained recording current set parameters are stored in a system cylinder, or non-volatile memory. Desired recording current set parameters are individually selected and used to match operating environmental conditions.

But there is a chance that a minimum BER (or CSM) will not be properly selected with respect to the degrees of TPTP obtained by the operations defined in FIG. 9. In particular, a CSM is a smaller value than a BER, and thus might result in a change in recording conditions, due to an ignorable error.

Figure 10:
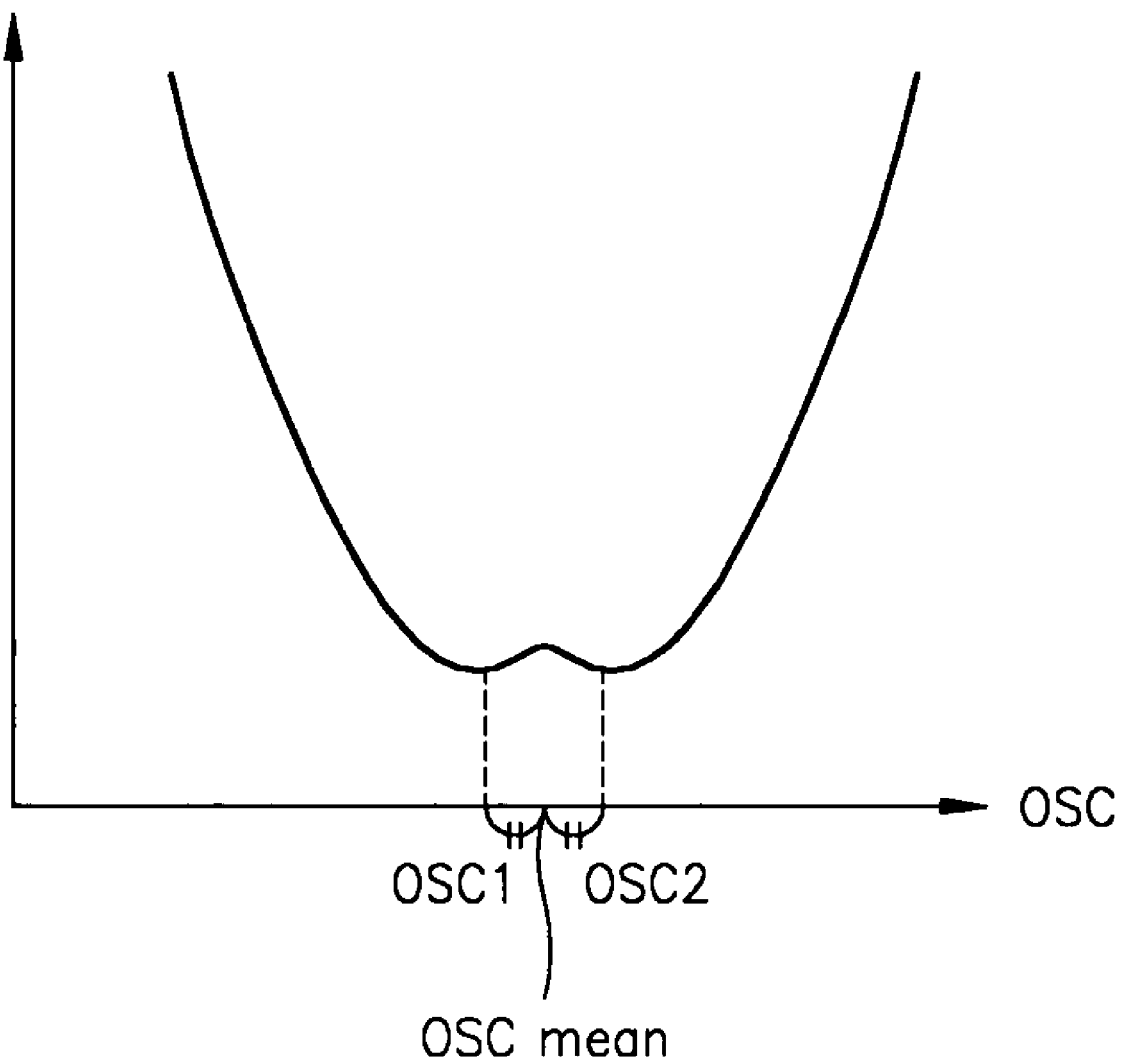
FIG. 10 is a graph illustrating other examples of TPTPs of different heads.

FIG. 10 is a graph illustrating other examples of TPTPs of different heads. Referring to FIG. 10, there are two OSCs: OSC1 and OSC2, corresponding to a minimum BER. In this case, normalization of the two OSCs, OSC1 and OSC2, is required. For normalization, a mean value of the two OSCs is computed to obtain an OSC, OSC_mean. But normalization may be performed using another method.

If TPTPs of different heads are measured using CSMs versus OSCs, the value range of an OSC obtained by normalization is within 1.3 times of a minimum CSM, according to one aspect. That is, a CSM corresponding to a selected OSC is limited to a value that falls within 1.3 times that of a minimum CSM.

If an OSC measured in a particular data zone of a disk is considerably higher or lower than OSCs measured in adjacent data zones, it is obvious that the OSC for the particular data zone is erroneously measured. In this case, normalization is performed with respect to the OSCs measured in the adjacent data zones.

Meanwhile, operation 904 of FIG. 9 may require a lengthy test time since data is recorded on the tracks adjacent to the target track many times. To solve this and/or other problems, operation 904 may be simplified by selecting a data zone in each of the inner diameter (ID), middle diameter (MD), and outer diameter (OD) of the disk, and measuring OSCs in only the selected data zones. The respective OSC values are used throughout all of the data zones of the ID, MD, and OD. A range of the change in an OSC may be determined to be narrower. For instance, if the range of change in an OSC is determined to be 32 steps, a high OSC is not required in a high-temperature mode, and thus is changed within a range from two to ten steps.

Also, the value of the OSC, OSC_d, may be set to a value between the OSC, OSC_2 suitable for a room-temperature mode, and an OSC corresponding to a minimum BER, which is obtained in operation 906.

In conclusion, the method of optimizing a recording current, shown in FIG. 9, is based on a fact that different heads have different recording and ATE characteristics. That is, in the method, the recording and ATE characteristics of an individual head are measured and stored in a system cylinder or a buffer; a minimum WC and OSC are set to correspond to operating environmental conditions within a range where the recording capability of the head is not altered, in consideration of ATE characteristics; and high WC and OSC, corresponding to a minimum BER, are used at low temperatures. Accordingly, a recording current can be optimized, while ensuring the recording capability of a head.

Figure 11:
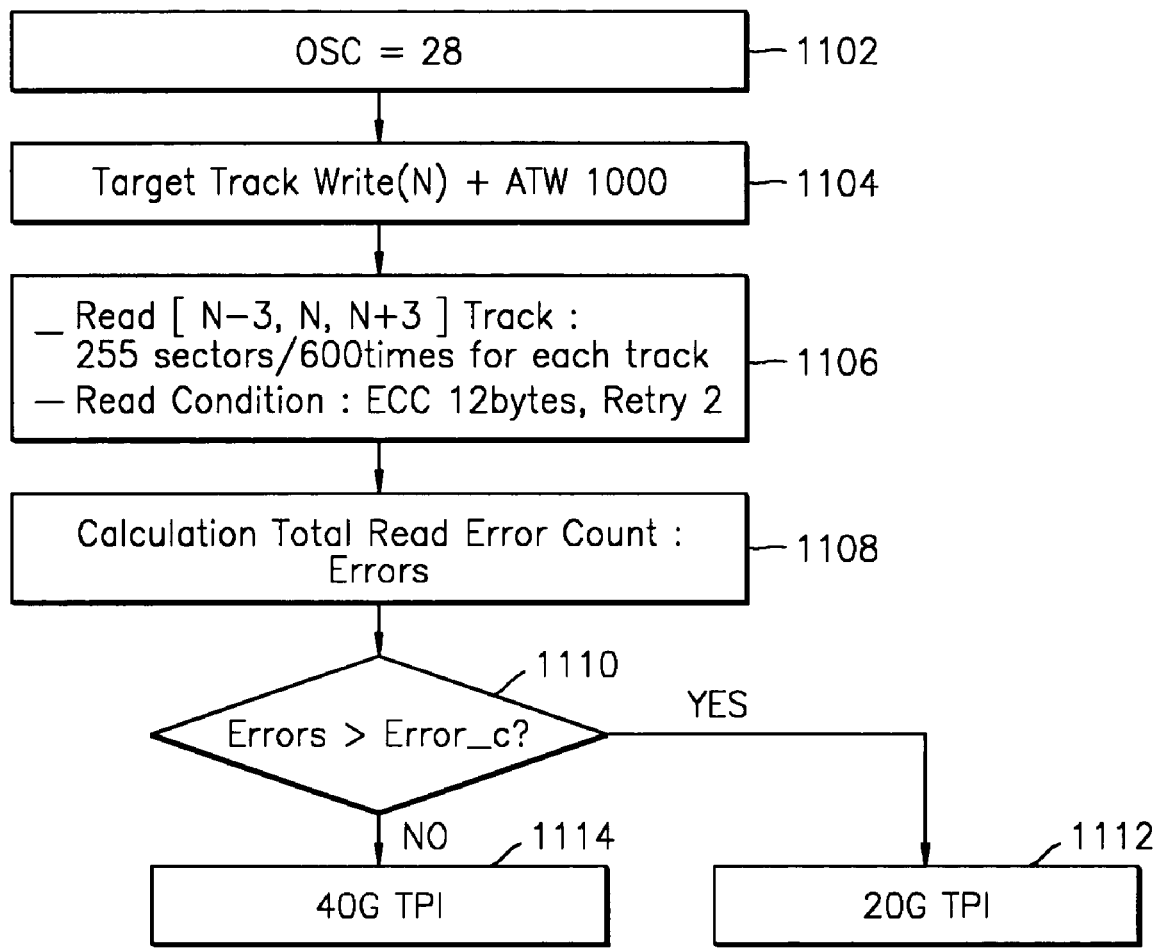
FIG. 11 is a flowchart illustrating a method of setting a recording density according to an embodiment of the present invention.

FIG. 11 is a flowchart illustrating a method of setting a recording density, according to an embodiment of the present invention.

In the method shown in FIG. 11, the rate of errors in data is measured under the worst operating environmental conditions, the measured rate of errors is compared with a predetermined threshold, Error_c, and a recording density is set based on the result of the comparison.

Referring to FIG. 11, the range of the change in an OSC is set in operation 1102.

Although the range of the change in an OSC is set to be as large as possible, it is preferable that, for safety, the range is slightly lower than the maximum range. For instance, if the OSC can be changed by a maximum of 32 steps, the range of the change is determined to be 28 steps.

In operation 1104, data is recorded on a target track a predetermined number of times, I, and recorded on respective adjacent tracks a predetermined number of times, J.

In operation 1106, data is read from three tracks a predetermined number of times, K, and errors contained in the read data are detected. The three tracks, while adjacent to the target track in the same direction, are selected from a total of seven tracks. The reason for recording data on the three adjacent tracks is because either magnetic leakage in a recording head may be generated either in a gap between recording poles or in a recording pole itself, or because a skew of the recording head must be considered.

In operation 1106, the levels of conditions that determine errors are lowered. For instance, an error-correcting code (ECC) length is reduced to be 12 bytes long, and the number of retries is also reduced to two times. If the ECC length is reduced to 12 bytes long, the capability of correcting errors is lowered. Also, since the number of retries is reduced to two times, the capability of correcting errors is further lowered.

In operation 1108, the number of errors is counted.

In operation 1110, the number of errors is compared with the predetermined threshold, Error_c.

In operation 1112, if it is determined in operation 1110 that the number of errors is larger than the predetermined threshold Error_c, tracks per inch (TPI) and the recording capacity are set to be lower than desired levels. Otherwise, the TPI and the recording capacity are set to the desired levels in operation 1114. For instance, the TPI is reduced to reduce a storing capacity when the rate of errors is larger than the predetermined threshold, Error_c, and a maximum TPI is maintained to maximize the storing capacity otherwise.

Here, the predetermined numbers I, J, and K may be changed according to quality requirements.

In the method of FIG. 11, the recording density is set while changing an OSC. But the recording density may be set while changing a WC or other factors.

The method of FIG. 11 is performed per head and data zone, and, the recording capacity of a disk and the TPI per data zone are set based on the result of performing the method.

In the method of FIG. 11, the rate of errors is measured under worst ATE test conditions of a hard disk drive, and the TPI or recording density of the disk is set based on the rate of errors.

As described above, in the method of optimizing the recording current, TPTP of heads are measured under test conditions suitable for operating temperatures, and recording parameters are determined, to obtain a minimum rate of errors, thereby obtaining an optimum recording current.

In the method of optimizing the recording current, the recording and ATE characteristics of individual heads are measured; the result of the measurement is stored in a system cylinder or a buffer; a WC and an OSC are set to minimum levels under actual operating environmental conditions in consideration of ATE characteristics of the head, within a range where the recording performance of the head is not altered; and the WC and the OSC are adjusted to high levels to correspond to a minimum BER, at low temperatures. Accordingly, the recording performances of individual heads can be ensured in consideration of their different recording and ATE characteristics.

In the method of setting the recording density, the rate of data errors is measured under the worst ATE test conditions that can be expected in the hard disk drive, and the TPI, or recording capacity, of the hard disk drive is set based on the measured rate of errors, thereby determining a minimum recording capacity thereof.

The "low temperature," and "low-temperature mode" discussed herein correspond to a range of temperatures of approximately 5–15° C. The "room temperature" and "room temperature mode" discussed herein correspond to a range of temperatures of approximately 20–30° C. And the "high temperature" and "high temperature mode" discussed herein correspond to a range of temperatures of approximately 40–50° C.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of optimizing a recording current of a hard disk drive, comprising:

measuring a rate of errors while changing a recording parameter of the hard disk drive under a test condition corresponding to a desired operating temperature but maintaining a test temperature;

selecting a recording parameter value corresponding to a smallest rate of errors under the test condition; and optimizing the recording parameter of the hard disk drive under the desired operating temperature using the selected recording parameter measured under the test condition corresponding to the desired operating temperature.

2. The method of claim 1, wherein when the test condition corresponds to a low temperature, data is recorded on a target track a predetermined number of times, and the data is read from the target track a predetermined number of times.

3. The method of claim 1, wherein when the test condition corresponds to a room temperature, data is recorded on tracks adjacent to a target track a predetermined number of times, N, and the data is read from the target track a predetermined number of times.

4. The method of claim 1, wherein the test condition comprises at least one of a recording number on a target track, recording numbers on tracks adjacent to the target track, and a reading number of the target track.

5. The method of claim 4, wherein as desired operating temperature rises, the recording numbers on tracks adjacent to the target track correspondingly rise.

6. A method of optimizing a recording current, comprising:

measuring a rate of errors under a test condition corresponding to an operating temperature of a hard disk drive, while changing a recording parameter;

selecting a recording parameter value corresponding to a smallest rate of errors; and optimizing the recording current for the hard disk drive under operating environmental conditions using the selected recording parameter value, wherein when the test condition corresponds to a room temperature, data is recorded on tracks adjacent to a target track a predetermined number of times, N, and the data is read from the target track a predetermined number of times, when the test condition corresponds to a high temperature, data is recorded on tracks adjacent to a target track a predetermined number of times, M, wherein M>N, and the data is read from the target track a predetermined number of times.

7. The method of claim 6, wherein when the test condition corresponds to the high temperature, the measuring of the rate of errors is performed in a data zone selected from each of an inner diameter (ID), a middle diameter (MD), and an outer diameter (OD) of a disk of the hard disk drive, and each recording parameter obtained in each of the respective selected data zones is applied throughout all of the data zones in the respective ID, MD, and OD.

8. A method of optimizing a recording current, comprising:
- measuring a rate of errors under a test condition corresponding to an operating temperature of a hard disk drive, while changing a recording parameter;
- selecting a recording parameter value corresponding to a smallest rate of errors;
- optimizing the recording current for the hard disk drive under operating environmental conditions using the selected recording parameter value; and
- normalizing a graph illustrating the recording parameter versus rate of errors,
- wherein during normalizing, when there are at least two recording parameter values corresponding to the smallest rate of errors, the method further comprises computing a mean value of the corresponding parameter values.

9. A method, comprising:
- for a range of operating temperatures for a hard disk drive, measuring a rate of errors for a range of values of a recording parameter;
- selecting and storing the recording parameter value corresponding to a minimum rate of errors for a given operating temperature;
- monitoring the operating temperature during recording to the hard disk drive; and
- employing the stored recording parameter value corresponding to the monitored operating temperature,
- wherein when there are at least two recording parameter values that correspond to the minimum rate of errors for the given operating temperature, then the selecting of the recording parameter value comprises normalizing the at least two recording parameter values.

* * * * *